(12) United States Patent
Swartz

(10) Patent No.: US 8,060,565 B1
(45) Date of Patent: Nov. 15, 2011

(54) VOICE AND TEXT SESSION CONVERTER

(75) Inventor: Douglas W. Swartz, Lakewood, CO (US)

(73) Assignee: Avaya Inc., Basking Ridge, NJ (US)

( * ) Notice: Subject to any disclaimer, the term of this patent is extended or adjusted under 35 U.S.C. 154(b) by 417 days.

(21) Appl. No.: 11/669,778

(22) Filed: Jan. 31, 2007

(51) Int. Cl.
*G06F 15/16* (2006.01)

(52) U.S. Cl. ............................ 709/206; 709/205; 704/4

(58) Field of Classification Search ........... 709/204–207
See application file for complete search history.

(56) References Cited

U.S. PATENT DOCUMENTS

| | | | |
|---|---|---|---|
| 5,206,903 A | 4/1993 | Kohler et al. | |
| 5,216,603 A | 6/1993 | Flores et al. | |
| 5,323,314 A | 6/1994 | Baber et al. | |
| 5,619,555 A | 4/1997 | Fenton et al. | |
| 5,627,978 A | 5/1997 | Altom et al. | |
| 5,793,365 A | 8/1998 | Tang et al. | |
| 5,828,747 A | 10/1998 | Fisher et al. | |
| 5,889,945 A | 3/1999 | Porter et al. | |
| 5,905,793 A | 5/1999 | Flockhart et al. | |
| 5,960,406 A | 9/1999 | Rasansky et al. | |
| 5,982,873 A | 11/1999 | Flockhart et al. | |
| 6,094,681 A | 7/2000 | Shaffer et al. | |
| 6,147,685 A | 11/2000 | Bliss et al. | |
| 6,163,607 A | 12/2000 | Bogart et al. | |
| 6,173,053 B1 | 1/2001 | Bogart et al. | |
| 6,192,122 B1 | 2/2001 | Flockhart et al. | |
| 6,330,243 B1 | 12/2001 | Strandberg | |
| 6,430,602 B1 | 8/2002 | Kay et al. | |
| 6,434,571 B1 | 8/2002 | Nolte | |
| 6,570,555 B1 | 5/2003 | Prevost et al. | |
| 6,662,309 B2 | 12/2003 | Ando et al. | |
| 6,683,870 B1 | 1/2004 | Archer | |
| 6,789,120 B1 | 9/2004 | Lee et al. | |
| 6,816,578 B1 * | 11/2004 | Kredo et al. | 379/88.17 |
| 6,944,277 B1 | 9/2005 | Viikki | |
| 7,007,235 B1 | 2/2006 | Hussein et al. | |
| 7,127,400 B2 | 10/2006 | Koch | |
| 7,203,297 B2 | 4/2007 | Vitikainen et al. | |
| 7,496,625 B1 * | 2/2009 | Belcher et al. | 709/204 |

(Continued)

FOREIGN PATENT DOCUMENTS

EP  0903679  3/1999

(Continued)

OTHER PUBLICATIONS

Avaya, Inc. "Advanced Speech Access," available at http://www.avaya.com/ac/common/index.jhtml?location=M1H1005G1007F2033P3086N4612, downloaded Jul. 14, 2003.

(Continued)

*Primary Examiner* — Peter-Anthony Pappas
*Assistant Examiner* — Ninos Donabed
(74) *Attorney, Agent, or Firm* — Sheridan Ross P.C.

(57) ABSTRACT

In one embodiment, a communication system is provided that includes:
(a) an input operable to receive incoming instant messages;
(b) a text-to-speech converter 220 operable to convert a text message in an incoming instant message into a voiced equivalent thereof;
(c) a speech-to-text converter 232 operable to convert a voice signal into a text equivalent thereof;
(d) a message completion agent 428 operable to convert the text equivalent into an outgoing instant message; and
(e) an output operable to send the outgoing instant message to a selected recipient.

13 Claims, 5 Drawing Sheets

U.S. PATENT DOCUMENTS

| | | | |
|---|---|---|---|
| 2002/0055350 A1 | 5/2002 | Gupte et al. | |
| 2003/0018720 A1 | 1/2003 | Chang et al. | |
| 2003/0028380 A1* | 2/2003 | Freeland et al. | 704/260 |
| 2003/0028621 A1 | 2/2003 | Furlong et al. | |
| 2003/0185360 A1* | 10/2003 | Moore et al. | 379/114.01 |
| 2004/0086100 A1* | 5/2004 | Moore et al. | 379/201.01 |
| 2005/0021344 A1* | 1/2005 | Davis et al. | 704/277 |
| 2005/0044157 A1* | 2/2005 | Bartholomew Donovan | 709/206 |
| 2005/0074101 A1* | 4/2005 | Moore et al. | 379/114.01 |
| 2005/0125246 A1 | 6/2005 | Muller et al. | |
| 2005/0165631 A1 | 7/2005 | Horvitz | |
| 2005/0267757 A1* | 12/2005 | Iso-Sipila et al. | 704/260 |
| 2006/0167992 A1* | 7/2006 | Cheung et al. | 709/204 |
| 2006/0230137 A1 | 10/2006 | Gare et al. | |
| 2007/0036294 A1 | 2/2007 | Chaudhuri et al. | |
| 2007/0047522 A1 | 3/2007 | Jefferson et al. | |
| 2007/0143410 A1* | 6/2007 | Kraft et al. | 709/206 |
| 2007/0174396 A1* | 7/2007 | Kumar et al. | 709/206 |
| 2007/0203987 A1* | 8/2007 | Amis | 709/206 |
| 2008/0140398 A1* | 6/2008 | Shpigel | 704/235 |
| 2010/0070275 A1* | 3/2010 | Cast | 704/235 |

FOREIGN PATENT DOCUMENTS

| | | |
|---|---|---|
| EP | 1 560 138 | 8/2005 |
| WO | WO03/025776 A1 | 3/2003 |
| WO | WO03/085539 A1 | 10/2003 |

OTHER PUBLICATIONS

Hotsip, "Mobile Presence Bringing you closer", XP-002227729, Jun. 2001, pp. 1-5.

Winther, Mark et al., "Speech Interfaces Drive Mobile Responsiveness," IDC Executive Brief, pp. 1-7, Mar. 2002.

U.S. Appl. No. 10/658,821, filed Sep. 8, 2003, Mamnani.

Step-By-Step Manual, Microsoft Outlook, Online Training Solutions, Inc. (2004) (Manual appears in 3 parts. It is too bulky to e-file in a single document.).

http://www.effectivemeetings.com (SMART Technologies, Inc., May 2003).

http://en.wikipedia.org/wiki/Microsoft Outlook; printed Mar. 14, 2006; 4 pages.

http://www.bcentral.co.uk/products/microsoft-outlook.mspx, printed Mar. 14, 2006; 2 pages.

"Avaya™ Unified Communication Center (UCC) Speech Access Solution", Avaya, Inc. (2002), 4 pages.

"Avaya by Example; Three-Week Wonder: Avaya Unified Communication Center Speech Access Gives Road Warriors 15 Additional Days Each Year", Avaya, Inc. (2005) 3 pages.

Arthur M. Rosenberg and David A. Zimmer, "Migrating to Enterprise-Wide Communications: The Branch Office Dilemma", May 2003, 14 pages.

Messaging and Scheduling—Unified Communication Center, Features, http://www.avaya.com/gcm/master-usa/en-us/products/offers/ucc_r2.htm&View=Prod Features, Avaya Inc. Jan. 17, 2007.

Messaging and Scheduling-Unified Communication Center, Description, http://www.avaya.com/gcm/master-usa/en-us/products/offers/ucc_r2.htm&View=ProdFeatures, Avaya Inc. Jan. 17, 2007.

Modular Messaging VoiceMail-Modular Messaging, Description http://www.avaya.com/gcm/master-usa/en-us/products/offers/modular_messaging_30,htm&View=ProdDesc, Avaya Inc. Jan. 17, 2007.

Message Networking-Product Features, Features, http://www.avaya.com/gcm/master-usa/en-us/products/offers/message_networking01.htm&View=ProdFeatures, Avaya Inc. (Jan. 17, 2007) pp. 1-4.

Arthur M. Rosenberg and David A. Zimmer, "Beyond VoIP: Enterprise Perspectives on Migrating to Multi-Modal Communications and Wireless Mobility", (Oct. 2004) 38 pages.

HowStuffWorks, "How Instant Messaging Works", Introduction, http://computer.howstuffworks.com/instant-messaging.htm (Jan. 16, 2007) 4 pages.

HowStuffWorks, "How Instant Messaging Works", Background, http://computer.howstuffworks.com/instant-messaging1.htm (Jan. 16, 2007) 4 pages.

HowStuffWorks, "How Instant Messaging Works", ICQ, http://computer.howstuffworks.com/instant-messaging2.htm (Jan. 16, 2007) 4 pages.

HowStuffWorks, "How Instant Messaging Works", AIM, http://computer.howstuffworks.com/instant-messaging3.htm (Jan. 16, 2007) 4 pages.

HowStuffWorks, "How Instant Messaging Works", More IM Utilities, http://computer.howstuffworks.com/instant-messaging4.htm (Jan. 16, 2007) 4 pages.

AIM Acronym Dictionary, http://www.aim.com/acronyms.adp (Jan. 16, 2007) 7 pages.

AIM Presence Services, http://developer.aim.com/presenceMain.jsp (2006) 2 pages.

New to Instant Messaging? —Yahoo! Messenger, http://messenger.yahoo.com/newtoim.php (Jan. 16, 2007) 8 pages.

AIM Bots, http://developer.aim.com/botMain.jsp (2006) 2 pages.

AIM Buddy Info, http://buddyinfo.aim.com/ (2006) 2 pages.

AIM Pro—Free Secure Business Instant Messaging, Video Conferencing, Net Meeting, http://aimpro.premiumservices.aol.com/ (Jan. 16, 2007) 2 pages.

Ivtta Turin 98, "The Linguistic Components of the REWARD Dialogue Creation Environment and Run Time System", http://cpk.auc.dk/~tb/articles/ivtta98.htm (Sep. 1998) 13 pages.

Rob Kassel, "How Speech Recognition Works", http://www.microsoft.com/speech/docs/How_Speech_Works_Article.htm (Nov. 30, 2004) 4 pages.

"Speech synthesis—Wikipedia, the free encyclopedia", http://en.wikipedia.org/wiki/Speech_synthesis (Jan. 12, 2007) 10 pages.

"Speech recognition—Wikipedia, the free encyclopedia", http://en.wikipedia.org/wiki/Speech_recognition (Jan. 12, 2007) 7 pages.

Victor Zue, Ron Cole, Wayne Ward, "1.2: Speech Recognition", http://cslu.cse.ogi.edu/HLTsurvey/ch1node4.html (Jan. 15, 2007) 7 pages.

Priscilla Oppenheimer, "Digitizing Human Vocal Communication", http://www.troubleshootingnetworks.com/language.html (Jan. 15, 2007) 8 pages.

"Telecommunications Device for the Deaf", file://C:\DOCUME~1\Dswartz\LOCALS~1\Temp\3KPX6SXZ.htm (Dec. 8, 2006) 5 pages.

"How to Use a TTY", Netac Teacher Tipsheet, htt://72.14.203.104/search?q=cache:JdktLkxPgMUJ: www.netac.rit.edu/downloads/TPSHT_TTYpdf+%22teletypewriter%22+... (1999) 4 pages.

"TTY Brochure Feb. 2006", http://72.14.203.104/search?g=cache:O3tW0eQtbTEF:ods.utk.edu/brochures/TTYBrochureFebruary2006.pdf+%22teletypewrite... (Feb. 2006) 3 pages.

Tony Vitale, "Hardware and Software Aspects of a Speech Synthesizer Developed for Persons With Disabilities", http://codi.buffalo.edu/archives/computing/.dec.speech (1993).

Tony Vitale, "Hardware and Software Aspects of a Speech Synthesizer Developed for Persons With Disabilities", http://codi.buffalo.edu/archives/computing/.dec.speech (1993).

Dave Anderson and George McNeill, "Artificial Neural Networks Technology", http://www.dacs.dtic.mil/techs/dacs_reports/text/neural_nets.txt (Aug. 20, 1992) 145 pages.

B. Monegain, "FaceTime gives voice, vision to instant messaging. Customer demand spurs two partnerships", CC News: Call Center Technology (May 2000).

A. Rosenberg, "Enterprise Customer Interfaces: Application Messaging Via Instant Messaging", http://www.commweb.com/article/COM20021209S0001/2 (Dec. 9, 2002).

"Amica Insurance Selects FaceTime Communications to Provide Instant Messaging-Based Customer Service in Enterprise", http://www.facetime.com/pr/pr010625.shtm (Jun. 25, 2001).

"Overview: Manage the Power of Real-Time in the Enterprise", FaceTime Communications, http://www.factime.com/solutions.shtm (undated).

"Presence Management", FaceTime Communications, http://www.facetime.com/presence.shtm (undated).

S. Losi, "Instant Messaging for Call Centers Leaves 'Em Smiling", http://www.newsfacotr.com/perl/story/10246.html (Jun. 4, 2001).

T. Walsh, "Instant Messaging Boosts Service at Texas Call Center", http://www.gcn.com/cgi-bin/udt/im.display.printable?client.id=state2&story.id=16765 (Nov. 2001).

"VenusValley Live Support—Live chat for your website", XP-002351378 (undated).

L. Scribner et al., "WiredRed to Provide Secure Instant Messaging for Eight New Call Center Customers", http://www.wiredred.com/news_release_callctr.html (Sep. 28, 2002).

* cited by examiner

VOICE AND TEXT SESSION CONVERTER

FIELD OF THE INVENTION

The invention relates generally to multimedia sessions and particularly to real time joint voice and text sessions.

BACKGROUND OF THE INVENTION

Communication has developed dramatically in the last decade. The Internet now is the preferred vehicle for most interpersonal communications. The Internet is able to accommodate not only real time and non-real time text messaging but also real time voice, or Voice Over Internet Protocol or VoIP, communications.

The Session Initiation Protocol or SIP provides a powerful tool for effective interpersonal communications over the Internet. SIP is an application layer signaling, presence, and instant messaging protocol for effecting multimedia sessions. The main signaling functions of the protocol include location of an endpoint, contacting an endpoint to determine willingness to establish a session, exchange of media information to allow the session to be established, modification of existing media sessions, tear down of existing media sessions, publication and upload of presence information, request delivery of presence information, provision of presence and other event notifications, and transport of instant messages.

SIP incorporates elements of the Hyper Text Transport Protocol (HTTP) used for Web browsing. From HTTP, SIP borrowed a client-server design and the use of Universal Resource Locators (URLs) and Universal Resource Indicators (URIs). SIP uses e-mail-like names for addresses. SIP URIs correspond to either a user or single device or endpoint and can handle telephone numbers, transport parameters, as well as instant messaging handles and other items. A SIP URI is resolved to an IP address using a SIP proxy server and DNS lookups at the time of the call, for example.

The mechanics of SIP can be illustrated with reference to an instant messaging example. In the example, SUBSCRIBE is used to request status or presence updates from the presence server, and NOTIFY to deliver that information to the requestor or presence watcher. In the example, party A wishes to communicate by instant messaging with party B. To find out the status of party B, party A subscribes to party B's presence information by sending a SUBSCRIBE message to party B. Party B accepts the subscription by sending an 202 ACCEPTED response back to party A. The subscription begins when party B sending a NOTIFY message back to party A. Party A sends a 200 OK response to party B acknowledging receipt. While the subscription is effective, any change in status of party B is the subject of a NOTIFY message to party A. In this manner, party A is made aware, on a real time basis, of the status, or presence, of party B.

The mechanics of SIP will be further illustrated with reference to a voice call example. In the example, party A wishes to make a call to party B. Party A first sends an INVITE to a first proxy server. The first proxy server performs a DNS lookup of partyB's SIP URI domain name and returns the IP address of a second proxy server, which handles that domain. The INVITE is then sent to that address. The second proxy server looks up the SIP URI in its database and locates party B. The INVITE is then forwarded to party B's IP address with the addition of a second Via header field stamped with the address of the second proxy server. Party B returns a 180 RINGING message to the second proxy server, which forwards the message to the first proxy server. The first proxy server then forwards the message to party A. When the call is answered by party B, party B sends a 200 OK response. Party A, upon receipt of the response, sends an ACK message directly to party B. A media session is thus established. The call is disconnected using a BYE message.

Currently, many communication devices are capable of engaging in VoIP calls and instant messaging sessions. They cannot, however, engage in both at the same time. Generally, the device user must choose between the two options, such as when an incoming call is received during an instant messaging session.

Additionally, many communication devices are capable of engaging only in a VoIP call or an instant messaging session. Such devices cannot communicate in other types of sessions.

There is a need for a communication system that permits users to engage simultaneously in VoIP calls and instant messaging sessions.

SUMMARY OF THE INVENTION

These and other needs are addressed by the various embodiments and configurations of the present invention. The present invention is directed generally to multi-media sessions between first and second parties.

In one embodiment, the first party has a voice-based communication device and the second party a text-based communication device. The first party provides voice signals to his device while the second party provides inputted text to her communication device. The voice signals are converted into instant messages for transmission to the second party, and the instant messages from the second party are depacketized and converted into equivalent voice expressions for presentation to the first party. In this manner, the first and second parties can communicate using normally incompatible communication modes.

During text-to-speech conversion, standard and user configured acronyms characteristic of instant messaging are converted into equivalent unabbreviated textual expressions. Conversely, during speech-to-text conversion, acronyms are substituted in the converted text for equivalent textual expressions.

The voice- and text-based communication devices can provide their respective users with presence and availability information regarding the other party. This is done using, preferably, a presence server and subscription and notify messages.

The invention can have a number of benefits. For example, the ability of participants to converse using different media can provide an expanded number of communication options and greater user flexibility and convenience. Converting live voice streams into instant messages permits the recipient to participate simultaneously in dedicated instant messaging sessions and one or more voice calls. Previously, a user has had to select between these two options. The invention can also provide contact centers with additional options for multitasking. An agent can use a voice interface to generate and transmit simultaneously outgoing instant messages to multiple customers. The agent would have the ability to scroll readily through the various instant messages to track effectively numerous sessions. The interface can also enable multimedia messaging servers to receive and store not only voice and email messages but also voice and instant messages.

These and other advantages will be apparent from the disclosure of the invention(s) contained herein.

As used herein, the terms "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The terms "a" or "an" entity refer to one or more of that entity. As such, the terms "a" (or "an"), "one or more" and "at least one" can be used interchangeably herein. It is also to be noted that the terms "comprising", "including", and "having" can be used interchangeably.

The term "availability" refers to a state characterizing whether a subscriber controlling a device desires to be contacted by another communicating entity. Availability is normally implemented in the form of user-configured rules maintained at a presence server.

The term "contact" means a connection or request for connection between two or more communication devices. The contact can be, for example, a telephone call, a chat session, a VoIP session, a conference call, instant message session, and multi-media session.

The terms "determine", "calculate" and "compute," and variations thereof, as used herein, are used interchangeably and include any type of methodology, process, mathematical operation or technique.

The term "instant messaging" refers to real-time, on-line electronic mail.

The term "location" refers to the geographical coordinates associated with a communication device. Location may also mean a digital representation of the geographical location of a device.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The term "presence" is the existence of a communication device within the network through which an entity can communicate. Presence normally requires that a device be physically present within a network and that the device be in a state in which it can communicate. Presence typically implies the physical presence of a subscriber of the device.

The term "synchronous" or "real-time" refers to communications that are substantially immediate and whose expected response is substantially immediate. This includes telephone calls, instant messaging sessions, chat sessions, and the like.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

Overview of the Network Architecture

The exemplary systems and methods of this invention will be described in relation to telecommunication networks. However, to avoid unnecessarily obscuring the present invention, the following description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a switch or server, a gateway, or communication device, or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

Figure 1:
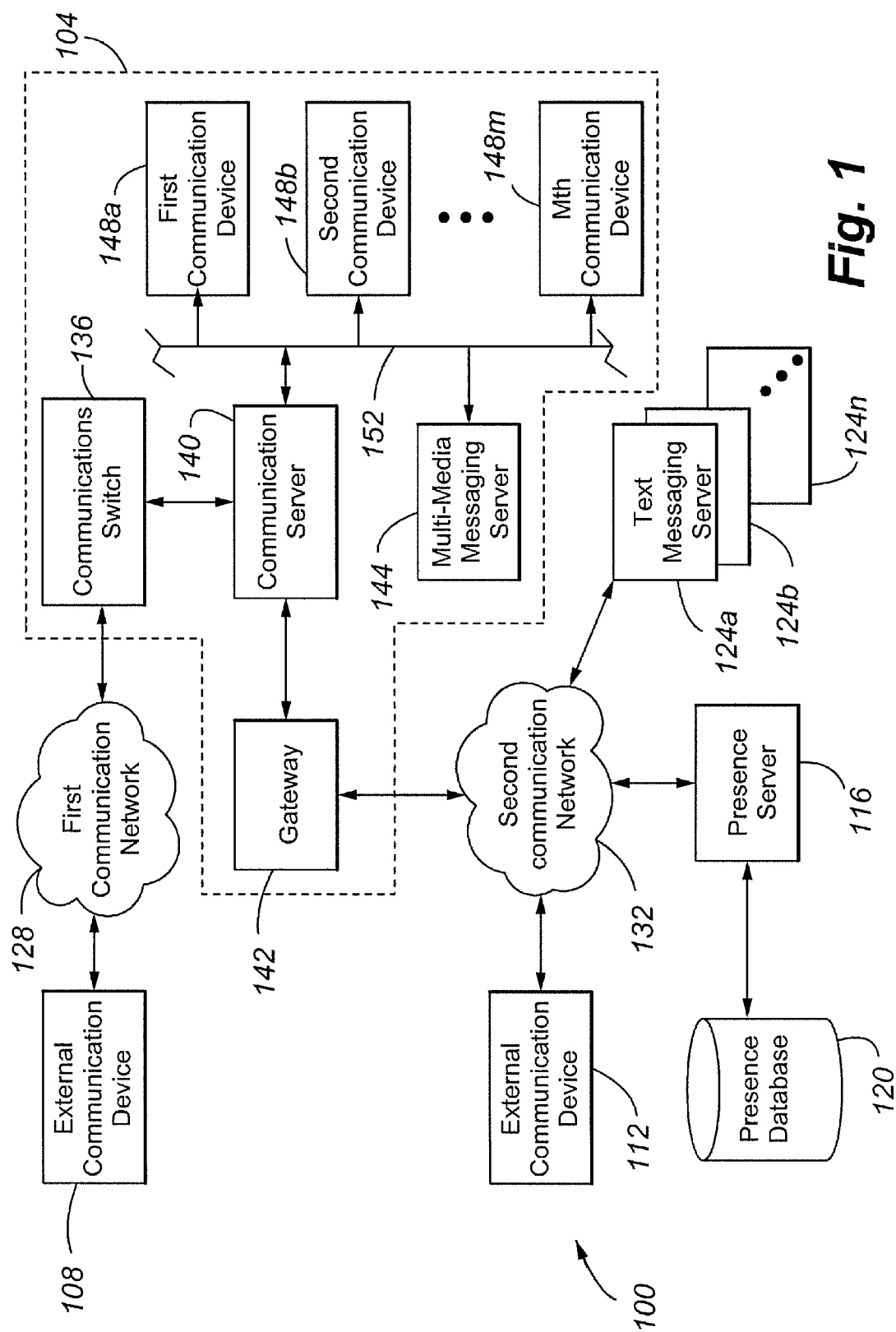
FIG. 1 is a block diagram of a communication system according to an embodiment of the present invention.

Referring to FIG. 1, a communication system 100 according to a first embodiment is depicted. The system 100 includes a presence aware enterprise network 104, external communication devices 108 and 112, presence server 116 and associated presence database 120, and a plurality of text messaging servers 124a-n interconnected by first or second communication networks 128 and 132. The first network 128 is preferably a circuit-switched network, such as the PSTN, while the second network 132 is preferably a packet-switched network, such as the Internet. The second 132 typically includes proxies, registrars, and routers for managing packet flows.

The enterprise network 104 in turn includes a communications switch 136 and server 140, a gateway 142, a presence aware multi-media messaging server 144, and first, second, . . . mth communication devices 148a-m interconnected by a Local Area Network or LAN 152.

The communication switch and/or server 136 and 140 can be any architecture for directing contacts to one or more communication devices. Illustratively, the switch and/or server of FIG. 1 can be the subscriber-premises equipment sold by Avaya Inc. under the tradename Definity™, MultiVantage™, Communication Manager™, S8300™, S8400™, S8500™, S8710™, and S8720™. The switch or server typically is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. The switch or server comprises a network interface card to provide services to the first, second, . . . mth communication devices 148a-m. Included in the memory is a presence aware telephony agent (not shown) to interact with the presence server 116 when handling communications directed to a communication device. The presence server 116 is referenced by presence-aware telephony agent on every initiated or terminated contact.

The gateway 142 provides signal control and conversion capabilities between the second communications network 132 and the enterprise network 104. The gateway can be any suitable device, such as those sold by Avaya, Inc., under the tradenames G150™, G250™, G350™, G650™, and G700™.

The presence aware messaging system 144 is a repository for various kinds of messages and can be any multi-media messaging system, such those sold by Avaya, Inc., under the tradenames INTUITY-AUDIX™, MODULAR MESSAGING™, and OCTEL 250/350. As will be appreciated, the messages can be of various types and forms, such as voice messages or voice mail, e-mail, faxes, instant messages, paging signals, broadcasts, notices, alerts, calendar items, multimedia multi-part messages, and cross-media messages.

The internal and external communications devices 148a-m, 108, and 112 can be any communication device suitable for the network to which they are connected. As used herein, "internal" refers to communication devices controlled by the switch and/or server (e.g., having an extension controlled by the switch and/or server) and "external" refers to communication devices not controlled by the switch and/or server. Internal devices are used by subscribers to the enterprise network. A "subscriber" refers to a person who is serviced by, registered or subscribed with, or otherwise affiliated with a messaging system. The first, second, . . . mth communication devices 148a-m are connected to the LAN 152 and can include, for example, wired or wireless IP hardphones, IP softphones, circuit-switched or Time Division Multiplexed (TDM) phones, Personal Digital Assistants or PDAs, Personal Computers or PCs, and laptops. The external communication device 108 is circuit-switched or TDM and can include, for example, wired and wireless telephones, PDAs, pagers, facsimile machines, and modems. The external communication device 112 is packet-switched and can include, for example, wired and wireless IP hardphones, IP softphones, PDAs, cellular phones, and the like.

The presence server 116 collects published presence information about a communication device and/or user thereof and stores the collected information in the presence information database 120. The presence server 116 typically retrieves presence information by querying against the user's identity as opposed to the device address. In the presence information database 120 all presence information is indexed by a user's identity rather than device address. The presence server 116 provides the collected information to other network entities in response to queries. The presence server 116 can collect only information respecting the user's interaction with the various entities of FIG. 1 and/or other information provided directly or indirectly by the user when those entities publish their presence information to the presence server. The presence server 116 can interact with additional presence services (now shown) that continually collect and redistribute availability data from publishing sources authorized by the user.

"Presence information" means any information associated with a network node and/or endpoint device, such as a communication device, that is in turn associated with a person or identity. Examples of presence information include registration information, information regarding the accessibility of the endpoint device, the endpoint's telephone number or address, the recency of use of the endpoint device by the person, recency of authentication by the person to a network component, the geographic location of the endpoint device, the type of media, format language, session and communications capabilities of the currently available communications devices, the preferences of the person (e.g., contact mode preferences or profiles such as the communication device to be contacted for specific types of contacts or under specified factual scenarios, contact time preferences, impermissible contact types and/or subjects such as subjects about which the person does not wish to be contacted, and permissible contact type and/or subjects such as subjects about which the person does wish to be contacted. Presence information can be user configurable, i.e., the user can configure the number and type of communications and message devices with which they can be accessed and to define different profiles that define the communications and messaging options presented to incoming contactors in specified factual situations. By identifying predefined facts, the system can retrieve and follow the appropriate profile.

The text messaging servers 124a-n are typically associated with differing service providers. Preferred text messaging servers 124a-n are instant messaging servers. Examples of suitable instant messaging protocols include AOL Instant Messenger™, ICQ™, MSN Messenger™, Yahoo! Messenger™, Jabber™, Session Initiation Protocol/Instant Messaging and Presence Leveraging Extensions or SIMPLE, Extensible Messaging and Presence Protocol or XMPP, Sametime™, Everybody™, and Trillian™, and the Instant Messaging and Presence Protocol. These protocols normally use one of the Transmission Control Protocol and User Datagram Protocol for data transmission over the Internet As will be appreciated, instant messaging, in a normal application, enables near real-time text communications between two or more individuals. Instant messaging allows one to maintain a list of people, such as a buddy list or contact list, that one wishes to communicate with. In a typical application, sending an instant message opens up a small window where the receiver can type in messages that both the receiver and sender can view. A party is notified when one of the people on the list is on line and the contact information of the person is provided. The party's contact information is also forwarded to the people on the contact list that are signed on. To initiate a contact, a person clicks on the name of a person on the list that is on line and a window opens into which text can be entered. The person can then send an inputted message by clicking a send command. Typically, communication is directly between the two clients. The other person gets the message and responds. The window that each person views expands to include a scrolling dialog of the conversation. When the conversation is completed, the message window is closed. When a person goes off line, the clients of each person on the list that are currently on line are notified that the person is now off line. The temporary file that contained the connection information, and typically the conversation itself, is deleted. Because instant messaging is a near real-time form of communication, most firewalls readily pass instant messages to avoid delays in the flow of communications.

The Media Translation System

Figure 2:
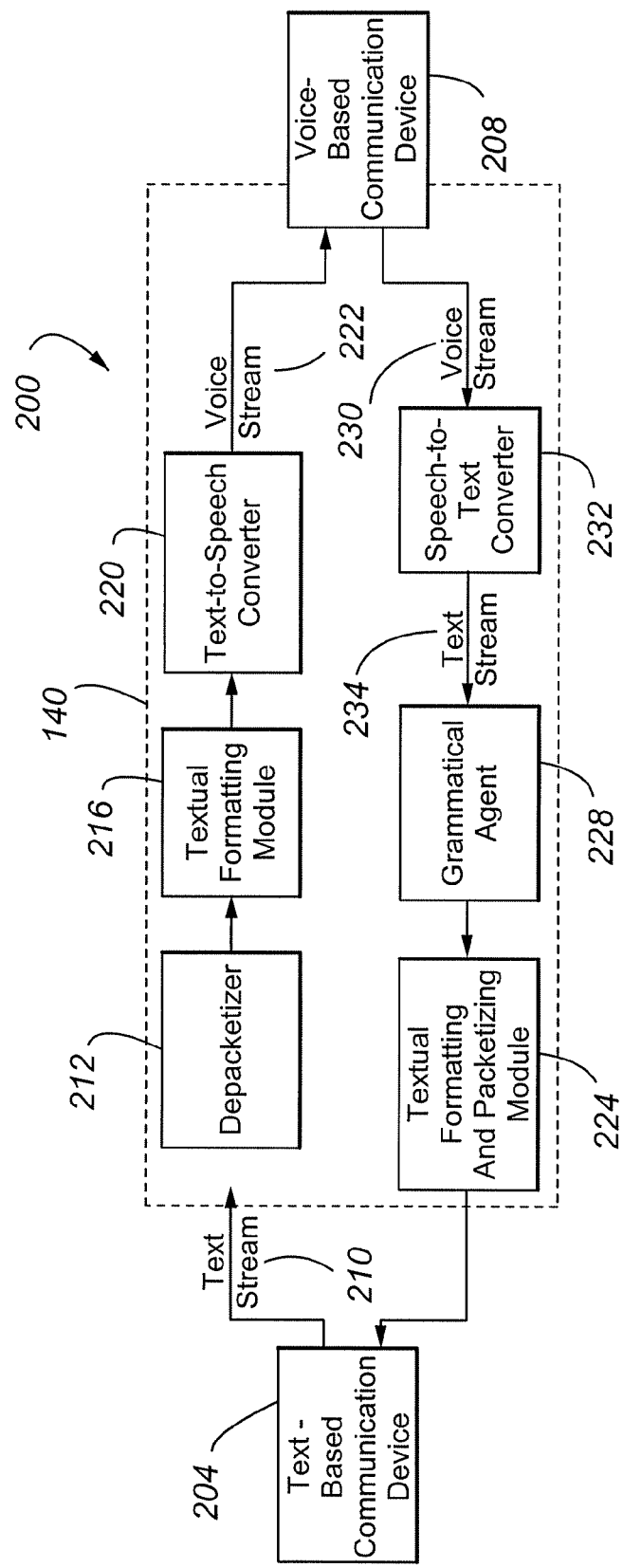
FIG. 2 is a block diagram of a media translation system according to an embodiment of the present invention.

Referring now to FIG. 2, a media translation system 200 will now be described. In one configuration, the system 200 is included in the memory of the communication server 140. The system 200 translates text communications transmitted by a text-based communication device 204 to voice equivalents for the voice-based communication device 208 and voice communications from the voice-based communication device 208 to text equivalents for the text-based communication device 204 and effects protocol translation. For processing communications on the bearer channel extending from the text-based communication device 204 to the voice-based communication device 208, the system includes, for example, a depacketizer 212 for depacketizing text message packets in the text stream 210, a textual formatting module 216 for converting the format of the text message into a parseable format readily discernible by a text-to-speech converter 220, and the text-to-speech converter 220 to convert the reformatted text message into its voice equivalent 222, which is then provided audibly to the user of the voice-based communication device 208. For processing communications on the bearer channel extending from the voice-based communication device 208 to the text-based communication device 204, the system includes, for example, a speech-to-text converter 232 for converting the voice stream 230 into its text equivalent 234, a grammatical agent 228 to form the recognized stream of words into properly punctuated sentences, and a textual formatting and packetizing module 224 to convert a word or set of words into user selected acronyms, populate the various text message fields in accordance with a selecting text messaging protocol, and packetize the populated text message, which is then transmitted to the text-based communication device 204.

The Text-To-Speech (TTS) converter 220 can be any suitable speech synthesis module. The TTS can create audible speech by concatenating pieces of recorded speech that are stored in a database (not shown). The size of the stored speech units can vary. Storing phones or diphones provides the largest output range but at the lack of clarity. For specific usage domains, the storage of entire words or sentences allows for high-quality output. Alternatively, the synthesis module can incorporate a model of the vocal tract and other human voice characteristics to create a completely synthetic voice output. Normally, the module will have front- and back-ends. The front-end converts raw text containing symbols like numbers and abbreviations into the equivalent of written-out words, which is referred to as text normalization, pre-processing, or tokenization. The textual formatting engine 216 performs this function of the front-end as discussed below. The other function of the front-end, namely assigning phonetic transcriptions to each word and dividing and marking the text into prosodic units, like phrases, clauses and sentences (also known as text-to-phoneme or grapheme-to-phoneme conversion), is performed by the TTS converter 220. Phonetic transcriptions and prosody information together make up the symbolic linguistic representation that is output by the front-end. The back-end, or synthesizer, converts the symbolic linguistic representation into sound. Synthesis can be effected by any number of techniques, including concatenative synthesis (e.g., unit selection synthesis, diphone synthesis, or domain-specific synthesis), formant synthesis, articulatory synthesis, sinewave synthesis, or Hidden Markov Model-based synthesis. A suitable markup language for rendering text as speech is Speech Synthesis Markup Language (SSML). Suitable TTS converters include MacInTalk™ or PlainTalk™ by Apple, AmigaOS™ and Amiga Speak Handler™, by Amiga, Narrator™, SAPI4™ and SAPI5™ by Microsoft, TTS™ by Lernout & Hauspie, and the like.

The Speech-To-Text (STT) converter 232 can be any suitable automatic speech recognition module. The converter 232 converts speech signals, which have been converted into a digital representation by an analog-to-digital converter, into a sequence of words by means of an algorithm implemented as a computer program. The STT converter is preferably based on a Hidden Markov Model (HMM), which is a statistical model outputting a sequence of symbols or quantities. The HMM outputs a sequence of n-dimensional real-valued vectors, each of which is output at a selected time interval. The vectors each include a cepstral coefficient, which is obtained by taking a Fourier transform of a selected speech segment and decorrelating the spectrum using a cosine transform followed by selection of the most significant coefficient(s). The HMM tends to have, in each state, a statistical distribution known as a mixture of diagonal covariance Gaussian distributions, which will provide a likelihood for each observed vector. Each selected segment of speech, whether a word or phoneme, has a different output distribution. A HMM for a sequence of selected speech segments is made by concatenating the individual trained HMMs for the separate segments.

STT converters can be implemented in a variety of ways. For example, the converter can be implemented as a neural network, a finite-state network, a dynamic time warping-based algorithm, or knowledge-based speech recognition algorithm and hybrids of the foregoing.

Figure 3:
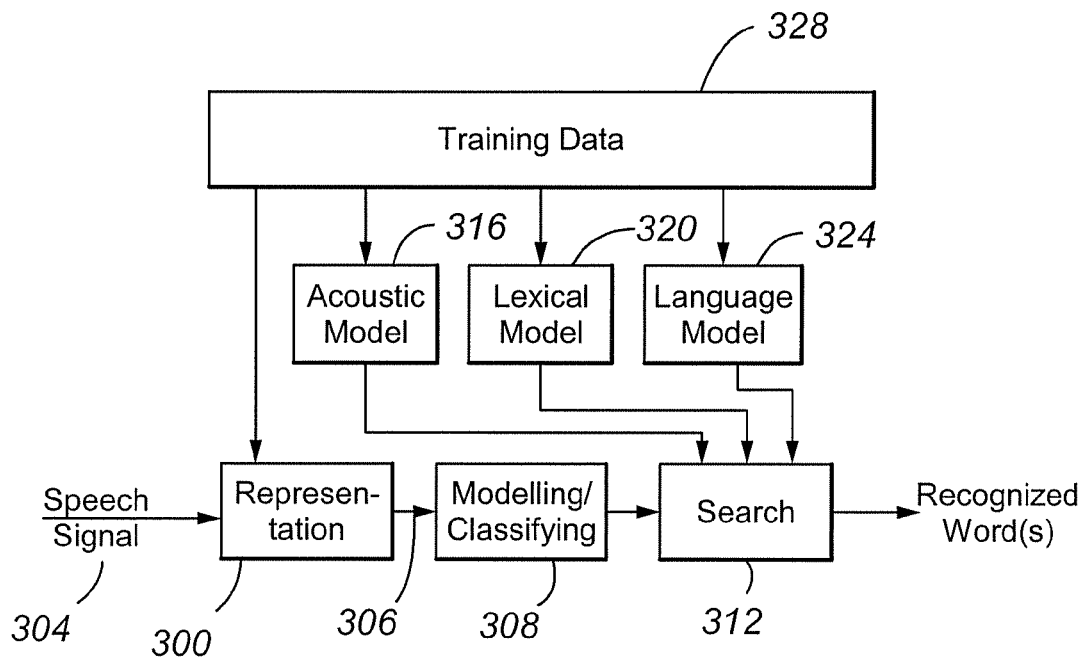
FIG. 3 is a block diagram depicting a prior art voice recognition module.

An exemplary STT converter 232 will be discussed with reference to FIG. 3. The converter includes a representation module 300 for transforming the digitized speech signal 304 into a signal representation 306 (emphasizing speaker-independent features while de-emphasizing speaker-dependent characteristics), a modeling/classifying module 308 to transform the signal representation into a set of measurements, and a search engine 312 to search for the most likely word candidate using constraints imposed by acoustic, lexical and language models 316, 320, and 324. Training data 328 is used by the representation module 300 and acoustic, lexical, and language models 316, 320, and 324 to determine the values of model parameters. Preferred STT converters include SpeechAttendant™ and OpenSpeech Recognizer™ by Scansoft, NaturallySpeaking™ by Dragon, and ViaVoice™ by IBM.

Figure 4:
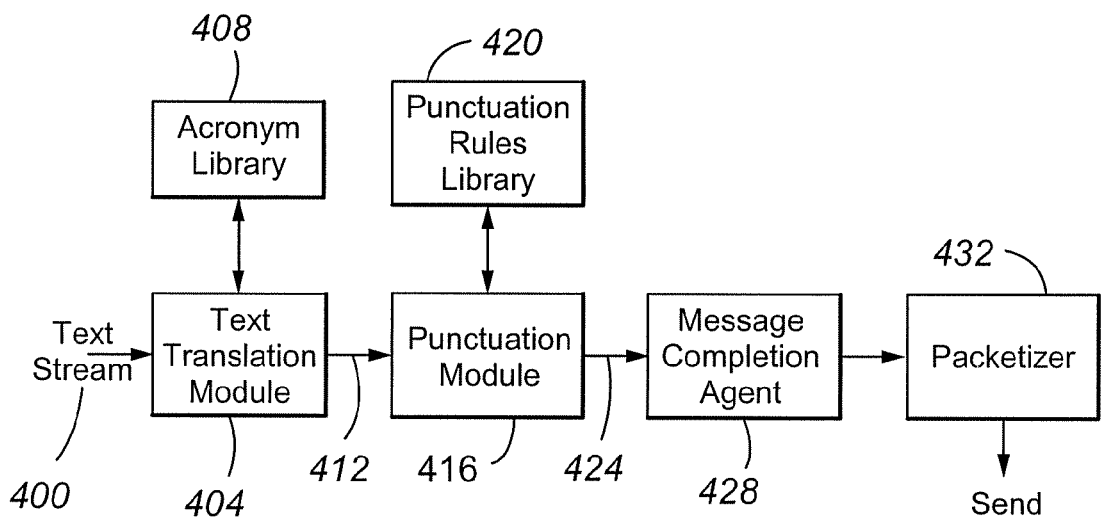
FIG. 4 is a block diagram depicting a textual formatting and packetizing module according to an embodiment of the present invention.

FIG. 4 depicts the grammatical agent 228 and textual formatting and packetizing module 224. The text stream 400 output by the converter 232 is processed by a text translation module 404 to convert the text into acronyms stored in the acronym library 408. As will be appreciated, instant messaging has standard acronyms for words and phrases and groups of users have nonstandard, customized acronyms. For example, the acronym "B" means the word "back", "B4N"

"bye for now", "BBS" "be back soon", "BTW" "by the way", "CID" "consider it done", "DQMOT" "don't quote me on this", "EOM" "end of message", "F2F" "face to face", "GR8" "great", "HAK" "hugs and kisses", "IM" "instant message", "JIC" "just in case", "K" "okay", "L8R" "later", "NE" "any", "OTP" "on the phone", "P911" "parent emergency", "SOZ" "sorry", "TTFN" "tat a for now", "U2" "you too", and "ZZZ" "tired or bored". The text stream 412 proceeds to the punctuation module 416, which inserts appropriate punctuation in the stream 412 using rules in the punctuation rules library 420. The text stream 424 is then processed by the message completion agent 428, which populates the various fields of the text message. For example, in an instant message the populated fields include instant message handle, message input display and/or post display (where the input message is posted after user review for transmission to the addressee), and the like. As will be appreciated, the message completion agent 428 can send the text message automatically or wait for user review and approval prior to sending the message. When the message is to be sent, the packetizer 432 packetizes the message and sends the message to the addressee or a text messaging server 124a-n associated with the addressee.

In one configuration, the agent 428 selects a messaging protocol from a plurality of messaging protocols. For example, the agent 428 maps the electronic address (e.g., instant messaging handle or telephone number) of the addressee against a protocol table to determine which instant messaging protocol is used by the instant messaging service of the addressee. By way of illustration, a first addressee uses a first protocol, such as ICQ™, while a second addressee uses a second protocol, such as Yahoo! Messenger™. A first message to the first addressee is formatted by the agent 428 consistent with the requirements of the first protocol, and a second message to the second addressee is formatted by the agent 428 consistent with the requirements of the second protocol.

Operational Embodiments of the Invention

Figure 5:
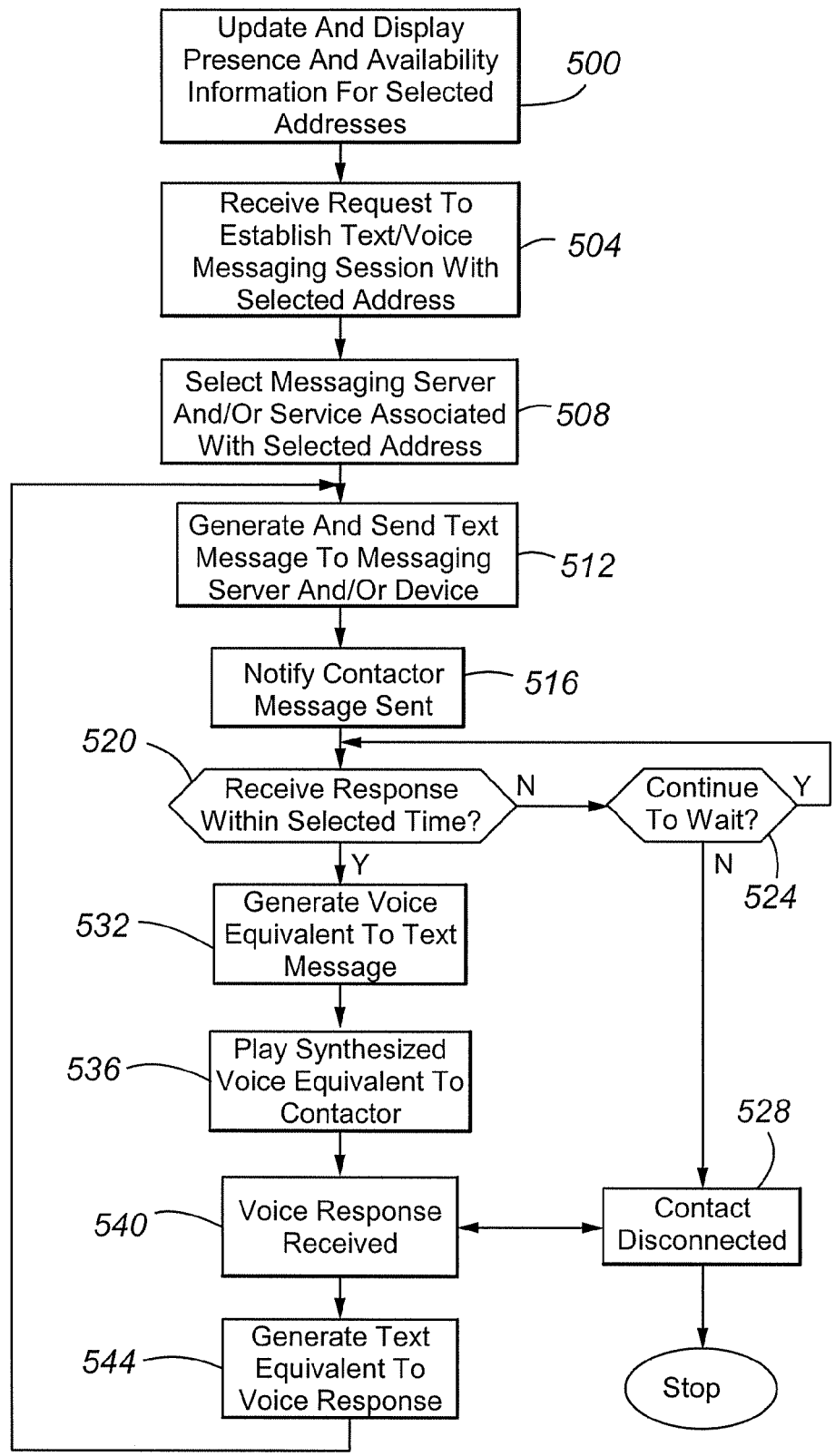
FIG. 5 is a flow chart depicting a multimedia session according to an embodiment of the present invention.

The operational embodiment of the present invention will now be described with reference to FIG. 5. The embodiment assumes that a first party seeks to initiate, from a voice-based communication device 208, a multi-media session with a text-based messaging device 204 of a second party.

In block 500, the first party's communication device 208 updates and visually displays or audibly provides to the first party presence and availability information for a set of selected addresses and/or persons. The information includes, for example, each person and that person's current presence and availability information. In the case of the second party, the information indicates that the second party is currently present and available at a text-based communication device 204. As noted, the presence and availability information is preferably obtained by a SUBSCRIBE message submitted to the presence server 116.

In block 504, the first party requests the establishment of a multi-media session with a selected address. This is preferably effected by the first party selecting from among a plurality of the second party's communication devices and/or accessible channels or modes of communication displayed on a graphical user interface. For example, the first party can select a text messaging icon associated with the second party. The first party's communication device may be a voice-only communication device or a multi-communication mode device. In the latter case, the first party would select from among the possible communication modes the desired voice mode of communication.

In block 508, the first party's communication device or a controlling communication server 140 selects the contact URI corresponding to the messaging server 124a-n associated with the second party or the text-based communication device 204 of the second party. In one configuration, the first party's communication device or its controlling server sends an INVITE to a first proxy server (not shown), which performs a DNS lookup to determine a second proxy server servicing the second party's URI domain name. The INVITE is then sent to that address. The second proxy server then forwards the INVITE to the second party's text-based communication device. The communication device responds with a 200 OK response confirming that the first party's message will be sent to the correct address.

In block 512, the first party's communication device or its controlling server generates and sends a text message to the messaging server of the second party or directly to the second party's text-based communication device. Typically, the text message content is predetermined and generated without input of the first party. The content may state, for example: "I am on a telephone and would like to talk with you. Would you like to continue?"

In block 516, the first party's communication device or its controlling server visually or audibly informs the first party that the message has been sent. The text of the message may also be provided to the first party.

In decision diamond 520, the first party's communication device or its controlling server determines whether or not a text message response has been received from the second party within a selected time. If not, the first party is asked in decision diamond 524 whether he or she would like to wait for the response. If the first party responds affirmatively, the logic loops back to decision diamond 520. If the first party responds negatively or fails to respond within a selected time interval, the contact is disconnected in block 528 by sending a further text message indicating that the first party has disconnected the contact.

When a text response is timely received, the response in block 532 is depacketized by the depacketizer 212, formatted properly by the textual formatting module 216 (which as noted converts abbreviated expressions into unabbreviated acronyms), and converted into a voice equivalent 222 by the converter 220.

In block 536, the converter plays the voice equivalent in a selected voice to the first party. The first party has the ability to select a set of desired voice characteristics from among a plurality of voice characteristics for each of his or her set of tracked addresses. In an instant messaging example, the first party can select a set of desired voice characteristics for each "buddy" on the first party's buddy list. The set of desired voice characteristics can, for example, be different male voices or female voices. This permits the first party to select a distinctive voice for each of his or her buddies and provide female buddies with female voice(s) and male buddies with male voice(s).

After playing the voice equivalent, the logic waits for a response within a selected period of time. If no voice response is received timely or if the first party disconnects, the logic proceeds to block 528. If a voice response is timely received in block 540, in block 544 the converter 232 converts the response into a text stream 234, the grammatical agent 228 punctuates the text stream 234 (by dividing the text stream into sentences and subparts thereof according to standard rules of grammar), and the textual formatting and packetizing module 224 formats the text stream for the text stream, such as is proper for an instant message, substitutes abbreviated acronyms for selected words of groups of words, populates the various fields of the text message, and packetizes the populated text message for transmission. The abbreviated acronyms selected for word groups may vary depending upon the counterparty to the conversation. For example, a user may define a first set of acronyms for use with a group of users considered friends while a second different set of acronyms are used with a groups of users considered co-workers. This allows the text-to-speech and speech-to-text conversion to be customized based on the counterparty to the conversation.

The logic then returns to block 512 and sends the text message to the second party's messaging server or directly to the second party's text-based communication device. The following steps are performed as noted above.

Figure 6:
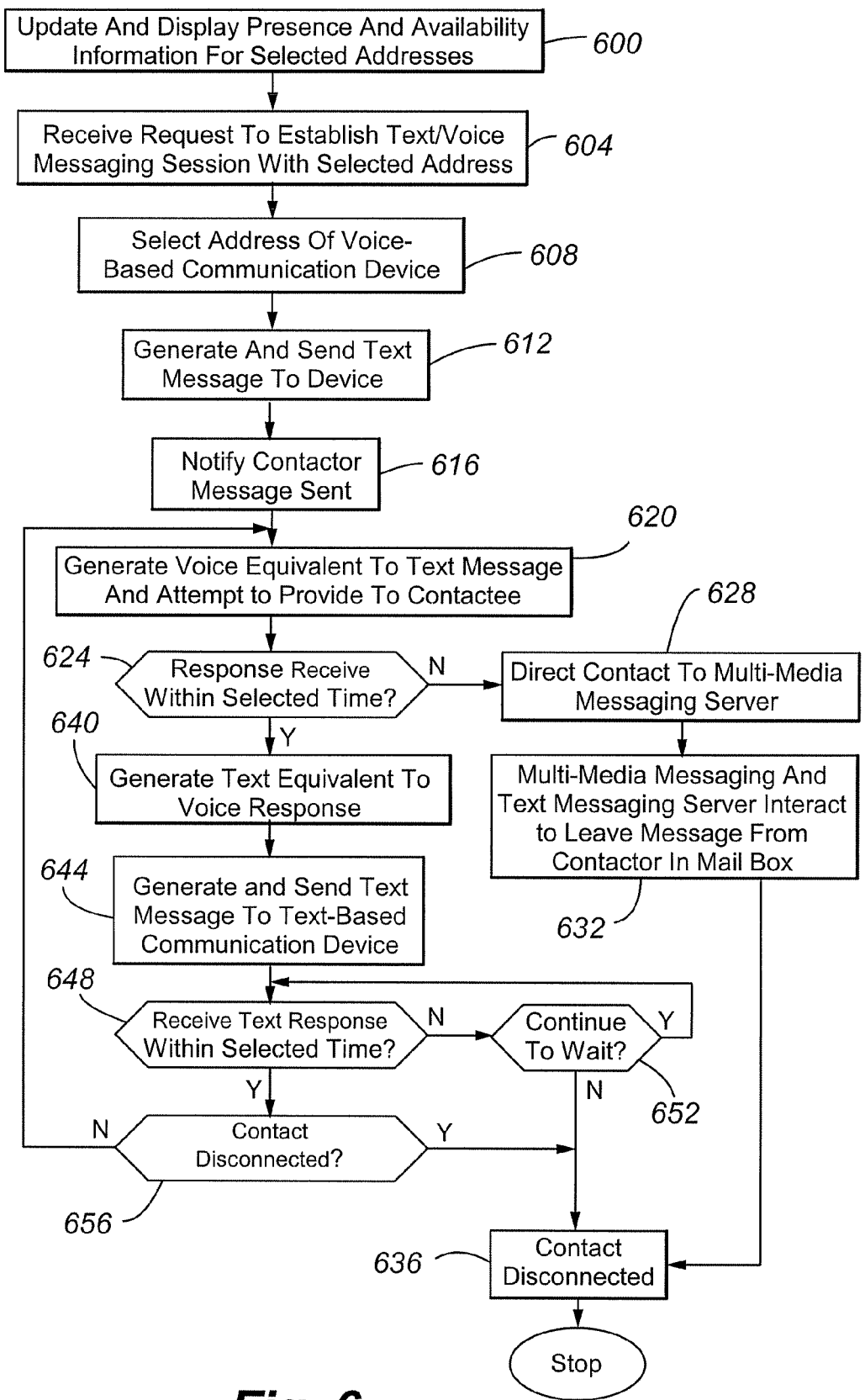
FIG. 6 is a flow chart depicting a multimedia session according to an embodiment of the present invention.

The operational embodiment of the present invention will now be described with reference to FIG. 6. The embodiment assumes that a first party seeks to initiate, from a text-based communication device 204, a multi-media session with a voice-based messaging device 208 of a second party.

In block 600, the first party's communication device 204 updates and visually displays or audibly provides to the first party presence and availability information for a set of selected addresses and/or persons. In the case of the second party, the information indicates that the second party is currently present and available at a voice-based communication device 208. As noted, the presence and availability information is preferably obtained by a SUBSCRIBE message submitted to the presence server 116.

In block 604, the first party requests the establishment of a multi-media session with a selected address. For example, the first party can select a voice conversation icon associated with the second party. The first party's communication device may be a text-only communication device or a multi-communication mode device. In the latter case, the first party would select from among the possible communication modes the desired voice mode of communication. Because the first party is normally in an instant messaging application when making the selection, new buddy icons can be displayed. Typical buddy icons for instant messaging status, include "online", "offline", "idle", "away", and "mobile". Additional buddy icons can be displayed for voice availability, including "busy" (indicating that the other party is currently engaged in a voice conversation), "voice online" (indicating that the other party is currently registered on his or her voice-based communication device), "voice offline" (indicating that the other party is not currently registered on his or her voice-based communication device), and "voice mobile" (indicating that the voice-based communication device is a mobile (wireless) phone.

In block 608, the text-based communication device 204 or its controlling server selects an address of the second party's voice-based communication device. In one configuration, the first party's text-based communication device sends an INVITE to a first proxy server (not shown), which performs a DNS lookup to determine a second proxy server servicing the second party's URI domain name. The INVITE is then sent to that address. The second proxy server then forwards the INVITE to the second party's voice-based communication device. The voice-based communication device responds with a 180 RINGING or 200 OK message, depending on the configuration.

In block 612, a text message is generated and sent to the voice-based communication device. The text message is preferably automatically generated and includes the electronic address of the voice-based communication device and/or a flag indicating that a voice channel is to be set up with the second party's voice-based communication device. The text message may further include a message such as "I would like to instant message you. Would you like to continue?"

In block 616, the text-based communication device notifies the first party that the text message has been sent and optionally periodically that the voice-based communication device is 180 RINGING.

In block 620, either the voice-based communication device or its controlling server receives the text message. From the included electronic address of the voice-based communication device and/or the flag, the communication device or its controlling server realizes that a multi-media session is requested involving a text messaging channel extending from the text-based communication device and a voice channel extending from the voice-based communication device. The controlling server attempts to deliver the voice equivalent to the text message to the voice-based communication device. This may be done for example by 180 RINGING the voice-based communication device, as is done for an incoming voice call.

In decision diamond 624, the logic determines whether a response has been received within a selected time or after a selected number of rings. If not, the controlling server in block 628 directs the contact to the multi-media messaging server 144. The messaging server 144 may correspond with the text-based communication device 204 using only text messages, voiced instructions, or a combination thereof. The text message received from the first party and to be provided to the second party may be presented to the second party, and stored, as the text message itself or its voiced equivalent. When the message is provided to the second party, the second party may be given the option to respond to the message using an outgoing text message including the text equivalent of a voiced response. Where multiple text messages from the first party are in the mail box of the second party, the messages may be combined, with the messages being played in the reverse order of receipt (e.g., most recent first and oldest last). Normal call coverage paths may be followed or disregarded, depending on the configuration. After the interaction with the multi-media messaging server 144 is completed, the contact is disconnected in block 636 by sending a BYE message.

When the contact is answered by the second party, a voiced equivalent of the text message is played audibly for the second party, as noted previously.

When a voiced response is received from the second party, the voiced response is converted into a text equivalent in block 640.

In block 644, the text equivalent is converted into a text message and sent to the text-based communication device 204.

In decision diamond 648, the logic determines whether a responsive text message has been received within a selected time. If not, the logic queries the first party in decision diamond 652 whether he or she wishes to wait. If yes, the logic returns to decision diamond 648. If no, the logic proceeds to block 636.

If a text message response is timely received, the logic determines in decision diamond 656 whether the second party has requested that the contact be disconnected. This may be done by the second party logging off of the text-based communication device, for example. If so, the logic proceeds to block 636. If not, the logic returns to block 620 with respect to the responsive text message.

A number of variations and modifications of the invention can be used. It would be possible to provide for some features of the invention without providing others.

For example in one alternative embodiment, one or more of components 212, 216, 220, 224, 228, and 232 are included in the text-based and/or voice-based communication device.

In another embodiment, the text-based and/or voice-based communication device may use a hot, or automated module, to respond automatically to messages received from the other device. This can permit the device to maintain a high volume of multi-media conversations with multiple users simultaneously. Bots are typically enabled or disabled by the user. The bot is instructed on how to respond to incoming messages using one or more scripting programs.

In another embodiment, the textual formatting and packetizing module 224 may be enabled to substitute or disabled from substituting abbreviated acronyms into the text stream.

In another embodiment, the multi-media session includes one or more video channel so that substantially real-time video images of one participant can be provided to the other participant.

In another embodiment, a communication device may be employed that only comprises an audio interface. In such an embodiment, the user of the communication device may interact with an IVR that provides options to the user in a similar fashion to the way text messaging options would be provided to a user with a visual interface. When such a device connects to a text-messaging server 124, the communication device may sequentially receive an audio message indicating the presence status of "buddies" related to the text-messaging server 124. In this way, the user of the communication device hears a first name of a contact and also hears that particular contact's presence status. If that contact is available, then the user may be provided with an option to "press 1 to send the contact a message" or "press 2 to go to your next contact." Based on the user's response, messaging sessions may be simultaneously created between the user and a plurality of counterparties. Furthermore, the order in which contacts are presented to the user may depend upon the frequency with which the user engages in text messaging sessions with that contact. The order may dynamically change as the user continues to engage with new contacts or other contacts at different frequencies.

In still another embodiment, a contact center agent may be able to employ a voice communication device to simultaneously handle a plurality of text-based contacts in the contact center. The text-based contacts may be provided in a real-time format, using instant messaging protocols as described herein, and the contact center agent can be assigned to a number of those contacts at the same time. A text to speech and speech to text conversion may occur at the contact processor, which may include a media translation system 200. The agent can create voice responses to the text messages received by the contact center, and the responses can be provided back to the customer in text format. The number of contacts simultaneously assigned to the agent may vary upon the agent's skill level and the nature of the contacts. The messages received from the plurality of contacts assigned to a given agent may be queued for that agent based on the time the message was received. After the agent has completed servicing a given contact, a new contact may be assigned to the agent from the contact center Automated Call Distribution (ACD) system.

In another embodiment, a skill group of contact center agents may be created based on the agent's capacity to handle text-message contacts with a voice based communication device. Such a skill group may be characterized by the ability to handle voice contacts and/or text contacts using the same communication device. When an agent from this particular skill group becomes available to handle contacts, the agent may be assigned a plurality of text-message contacts or a voice contact. In accordance with one embodiment, the text-message contacts may correspond to instant message contacts and/or email contacts.

In yet another embodiment, the systems and methods of this invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

The term "computer-readable medium" as used herein refers to any tangible storage and/or transmission medium that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. The features of the embodiments of the invention may be combined in alternate embodiments other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations, combinations, and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising: establishing a communication session between first and second communication devices of first and second parties, respectively;
   receiving, from the first party and by an input of the first communication device, a speech signal;
   converting, by a processor executable speech-to-text converter, the speech signal into an equivalent textual string, the textual string comprising a selected plurality of words;
   selecting, by a processor executable textual formatting and packetizing module, one of a first and second acronym library based on a determined identity of an intended instant message recipient as the second party, wherein the second party is associated with the first acronym library and another different party is associated with the second acronym library, wherein the first and second acronym libraries are different, and wherein the first and second acronym libraries contain differing sets of acronyms;
   converting, by the processor executable textual formatting and packetizing module and using the selected first acronym library, the selected plurality of words into an equivalent acronym to form a revised message text;
   generating, by the processor executable textual formatting and packetizing module, a first instant message to the second party, the first instant message including the revised message text;
   sending, by the first communication device and as part of the communication session, the first instant message to the second party;
   receiving, by the first communication device, from the second party, and as part of the communication session, a second instant message;
   determining that the second party is the sender of the second instant message;
   depacketizing, by the processor executable textual formatting and packetizing module, the second instant message to provide received message text, the received message text comprising at least one received message text acronym;
   selecting, by the processor executable textual formatting and packetizing module, the first acronym library based on the determination that the second party is the sender of the second instant message;
   converting, by the processor executable textual formatting and packetizing module and using the selected first acronym library, the at least one received message text acronym into an equivalent full text expression to form a revised received message text;
   converting by the processor executable textual formatting and packetizing module, the revised received message text into an equivalent voiced version thereof for presentation to the first party; and
   audibly presenting the equivalent voiced version to the first party,
   wherein the generating step comprises the substep: mapping an electronic address of the second party against an instant message protocol table to determine which instant messaging protocol is to be used in the first instant message, wherein a plurality of potential instant message recipients correspond to a plurality of different instant messaging protocols.

2. The method of claim 1, wherein the equivalent acronym and selected plurality of words are at least one of the following pairings: "B4N" for "bye for now", "BBS" for "be back soon", "BTW" for "by the way", "CID" for "consider it done", "DQMOT" for "do not quote me on this", "EOM" for "end of message", "F2F" for "face-to-face", "HAK" for "hugs and kisses", "IM" for "instant message", "JIC" for "just in case", "OTP" for "on the phone", "P911" for "parent emergency", "TTFN" for "ta ta for now", and "U2" for "you too" and further comprising:

receiving, by the first communication device, presence and availability information for the second party, the presence and availability information indicating that the second party is currently present and available at the second communication device, wherein presence and availability information includes at least one of registration information, information about accessibility of the second communication device, a recency of use of the second communication device by the second party, a recency of authentication by the second party to a network component, a geographic location of the second communication device, one of a type of media, format language, session, and communications capabilities of the second communication device, a contact preference of the second party, a contact mode of the second communication device, a profile of the second party, a rule about which communication device is to be contacted for specific types of scenarios, a contact time preference, an impermissible contact type, and a subject about which the second party does or does not wish to be contacted; and sending, by the first communication device, a request to establish a multi-media communication session between the first and second parties, wherein the first and second instant messages are exchanged between the first and second parties as part of the communication session.

3. The method of claim 1, wherein, in the audibly presenting step, the second party is associated with a first voice selected by the first party, wherein another party is associated with a second voice selected by the first party, and wherein the first and second voices are different and further comprising:

selecting the first voice based on the determined identity of the instant message sender as the second party, the first voice being used to audibly present the equivalent voiced version to the first party.

4. The method of claim 1, wherein the establishing step comprises:

determining whether or not a response has been received from the second party within a selected time; and
    applying the following rules:
        when the second party responds negatively or fails to respond, not establishing the communication session; and
        when the second party responds affirmatively, establishing the communication session.

5. The method of claim 1, wherein a first set of voice characteristics is associated with the second party, wherein a different second set of voice characteristics is associated with another party, wherein the first and second sets of voice characteristics are selected by the first party from among a plurality of sets of voice characteristics and assigned by the first party to the second and another parties, the plurality of sets of voice characteristics including the first and second sets of voice characteristics, and wherein the equivalent voiced version is audibly presented using the first set of voice characteristics.

6. The method of claim 1, further comprising:
    audibly playing, by the first communication device, a presence status of the second party.

7. A non-transitory tangible computer readable medium comprising processor executable instructions operable to perform the steps of claim 1.

8. A system, comprising: a first communication device comprising a processor operable to:

establish a communication session with a second communication device of a second party;
    receive, from a first party and by an input of the first communication device, a speech signal;
    convert, by a speech-to-text converter, the speech signal into an equivalent textual string, the textual string comprising a selected plurality of words;
    select, by a textual formatting and packetizing module, one of a first and second acronym library based on a determined identity of an intended instant message recipient as the second party, wherein the second party is associated with the first acronym library and another different party is associated with the second acronym library, wherein the first and second acronym libraries are different, and wherein the first and second libraries contain differing sets of acronyms;
    convert, by the textual formatting and packetizing module and using the selected first acronym library, the selected plurality of words into an equivalent acronym to form a revised message text;
    generate, by the textual formatting and packetizing module, a first instant message to the second party, the first instant message including the revised message text;
    send, as part of the communication session, the first instant message to the second party;
    receive, from the second party and as part of the communication session, a second instant message;
    determine that the second party is the sender of the second instant message;
    depacketize, by the textual formatting and packetizing module, the second instant message to provide received message text, the received message text comprising at least one received message text acronym;
    select, by the textual formatting and packetizing module, the first acronym library based on the determination that the second party is the sender of the second instant message;
    convert, by the textual formatting and packetizing module and using the selected first acronym library, the at least one received message text acronym into an equivalent full text expression to form a revised received message text;
    convert by the textual formatting and packetizing module, the revised received message text into an equivalent voiced version thereof for presentation to the first party; and
    audibly present the equivalent voiced version to the first party
    wherein the generating operation comprises the sub-operation: mapping an electronic address of the second party against an instant message protocol table to determine which instant messaging protocol is to be used in the first instant message, wherein a plurality of potential instant message recipients correspond to a plurality of different instant messaging protocols.

9. The system of claim 8, wherein the equivalent acronym and selected plurality of words are at least one of the following pairings: "B4N" for "bye for now", "BBS" for "be back soon", "BTW" for "by the way", "CID" for "consider it done", "DQMOT" for "do not quote me on this", "EOM" for "end of message", "F2F" for "face-to-face", "HAK" for "hugs and kisses", "IM" for "instant message", "JIC" for "just in case", "OTP" for "on the phone", "P911" for "parent emergency", "TTFN" for "ta ta for now", and "U2" for "you too"; and further comprising the operations:

receive presence and availability information for the second party, the presence and availability information indicating that the second party is currently present and available at the second communication device, wherein presence and availability information includes at least one of registration information, information about accessibility of the second communication device, a recency of use of the second communication device by the second party, a recency of authentication by the second party to a network component, a geographic location of the second communication device, one of a type of media, format language, session, and communications capabilities of the second communication device, a contact preference of the second party, a contact mode of the second communication device, a profile of the second party, a rule about which communication device is to be contacted for specific types of scenarios, a contact time preference, an impermissible contact type, and a subject about which the second party does or does not wish to be contacted; and send a request to establish a multi-media communication session between the first and second parties, wherein the first and second instant messages are exchanged between the first and second parties as part of the communication session.

10. The system of claim 8, wherein, in the audibly presenting operation, the second party is associated with a first voice selected by the first party, wherein another party is associated with a second voice selected by the first party, and wherein the first and second voices are different and further comprising the operation:

select the first voice based on the determined identity of the instant message sender as the second party, the first voice being used to audibly present the equivalent voiced version to the first party.

11. The system of claim 8, wherein the establishing operation comprises the sub-operations:

determine whether or not a response has been received from the second party within a selected time; and apply the following rules:

when the second party responds negatively or fails to respond, not establish the communication session; and when the second party responds affirmatively, establish the communication session.

12. The system of claim 8, wherein a first set of voice characteristics is associated with the second party, wherein a different second set of voice characteristics is associated with another party, wherein the first and second sets of voice characteristics are selected by the first party from among a plurality of sets of voice characteristics and assigned by the first party to the second and another parties, the plurality of sets of voice characteristics including the first and second sets of voice characteristics, and wherein the equivalent voiced version is audibly presented using the first set of voice characteristics.

13. The system of claim 8, further comprising the operation:

audibly play a presence status of the second party.

\* \* \* \* \*